United States Patent [19]

Masuda

[11] Patent Number: 6,055,249
[45] Date of Patent: Apr. 25, 2000

[54] LASER LIGHT EMITTING APPARATUS

[75] Inventor: Hisashi Masuda, Tokyo, Japan

[73] Assignee: Sony Corporation, Tokyo, Japan

[21] Appl. No.: 08/995,747

[22] Filed: Dec. 22, 1997

[30] Foreign Application Priority Data

Dec. 26, 1996 [JP] Japan ..................... 8-348869

[51] Int. Cl.[7] .................................................. H01S 3/10
[52] U.S. Cl. ........................ 372/22; 372/27; 372/100
[58] Field of Search ............................. 372/21, 22, 25, 372/27, 100

[56] References Cited

U.S. PATENT DOCUMENTS

| | | | |
|---|---|---|---|
| 3,873,825 | 3/1975 | Jones et al. | 372/25 |
| 5,134,622 | 7/1992 | Deacon | 372/22 |
| 5,144,630 | 9/1992 | Lin | 372/22 |
| 5,408,481 | 4/1995 | Scheps | 372/22 |
| 5,742,626 | 4/1998 | Mead et al. | 372/22 |

Primary Examiner—Leon Scott, Jr.
Attorney, Agent, or Firm—Limbach & Limbach L.L.P.

[57] ABSTRACT

A laser light emitting device includes a light source for emitting a continuous-wave laser light beam as a basic wave, a non-linear optical crystal for generating second harmonics, on which the basic wave is incident, a non-linear optical crystal for generating fourth harmonics, on which the second harmonics generated by the non-linear optical crystal for generating second harmonics is incident and a non-linear optical crystal for generating fifth harmonics, on which the basic wave transmitted through the non-linear optical crystal for generating second harmonics and fourth harmonics generated by the non-linear optical crystal for generating fourth harmonics are incident. The non-linear optical crystal for generating fifth harmonics additively mixes these incident waves for generating fifth harmonics. A time-averaged generated output of the second harmonics in the non-linear optical crystal for generating second harmonics is set to 50% to 70% or to 47% to 57% of a time-averaged output of the input wave incident on the non-linear optical crystal for generating second harmonics.

12 Claims, 4 Drawing Sheets

FIG.9

LASER LIGHT EMITTING APPARATUS

BACKGROUND OF THE INVENTION

1. Field of the Invention

This invention relates to a laser light emitting device used for fine working or as a light source for a light exposure device or as an illuminating device.

2. Description of Related Art

Heretofore, fifth harmonics of a laser light beam were generated by the laser of a low repetition frequency and high peak power. In case of solid-state lasers, the usual practice is to use a substantially collimated light beam, with the beam diameter being set to a larger value for evading damage to the crystal for wavelength conversion, using pulses of an extremely high laser power and a repetition frequency of the order of 1 to 100 pulses per second. However, this system has scarcely been put to practical use because of serious damages to crystals (see R. Kato, Researches in Laser. Vol.18, pp.3 to 7, W. Wiechmann et al., Post Deadline Papers of CLEO, 1995, CPD 19, and K. Deki et al., Extended Abstracts to Lectures of the Society of Applied Physics, 57th Autumnal Meeting, 7-a-M-9, pages 827). Therefore, proposals for optimizing the efficiency are lacking. In case of a UV light source for a light exposure device, a high repetition frequency is meritorious in view of removal of speckles. Except for proposals for maximizing the efficiency in each stage of waveform conversion or controlling the beam shape (S. Kubota et al., Patent Application entitled "Optimization of Beam Focus of UV Laser", there again lacks a proposal for optimising the overall efficiency.

That is, importance has not been attached to the problem of quantitative optimization due to the fact that the fifth harmonics are generated after three stages of waveform conversion so that the optical system for producing the fifth harmonics tends to be complex, the optical components tend to be damaged on generation of the UV light, and that fifth harmonics have not been used extensively for industrial applications.

The generation efficiency of the fifth harmonics is not that high because of many stages of waveform conversion. Therefore, if desired to apply the fifth harmonics to industrial use, it is necessary to maximize the generation efficiency of the fifth harmonics. If the generation efficiency of the fifth harmonics is to be maximized, that is if 100%-conversion is done in the extreme case, the basic wave cannot be additively frequency-mixed with the fourth harmonics generated from the second harmonics thus reducing the efficiency to 0%. Therefore, there must exist an optimum efficiency of generation of second harmonics. However, this quantitation has not been achieved to data.

SUMMARY OF THE INVENTION

It is therefore an object of the present invention to demonstrate that, for approaching to the maximum value of the efficiency of the average output of the fifth harmonics relative to the mean output of the basic wave, it is necessary to control the efficiency of generation of second harmonics to be in a pre-set range and to provide a laser light emission device for generating fifth harmonics with high efficiency by quantitating this pre-set range.

In view of the foregoing, the present invention demonstrates that, in a laser emitting device for generating fifth harmonics, the fifth harmonics generating efficiency is a function of the second harmonics generating efficiency such that there exists an optimum second harmonics generating efficiency, and also clarifies the range of the optimum generation efficiency for enabling the fifth harmonics to be used at the maximum efficiency.

In one aspect, the present invention provides a laser light emitting device having a light source for emitting a continuous-wave laser light beam as a basic wave, a non-linear optical crystal for generating second harmonics, on which the basic wave is incident, a non-linear optical crystal for generating fourth harmonics, on which the second harmonics generated by the non-linear optical crystal for generating second harmonics is incident and a non-linear optical crystal for generating fifth harmonics, on which the basic wave transmitted through the non-linear optical crystal for generating second harmonics and fourth harmonics generated by the non-linear optical crystal for generating fourth harmonics are incident, the non-linear optical crystal for generating fifth harmonics additively mixing these incident waves for generating fifth harmonics, in which a time-averaged generated output of the second harmonics in the non-linear optical crystal for generating second harmonics is set to 50% to 70% of a time-averaged output of the input wave incident on the non-linear optical crystal for generating second harmonics.

In another aspect, the present invention provides a laser light emitting device having a light source for emitting a continuous-wave laser light beam as a basic wave, a non-linear optical crystal for generating second harmonics, on which the basic wave is incident, a non-linear optical crystal for generating fourth harmonics, on which the second harmonics generated by the non-linear optical crystal for generating second harmonics is incident and a non-linear optical crystal for generating fifth harmonics, on which the basic wave transmitted through the non-linear optical crystal for generating second harmonics and fourth harmonics generated by the non-linear optical crystal for generating fourth harmonics are incident, the non-linear optical crystal for generating fifth harmonics additively mixing these incident waves for generating fifth harmonics, in which a time-averaged generated output of the second harmonics in the non-linear optical crystal for generating second harmonics being set to 47% to 57% of a time-averaged output of the input wave incident on the non-linear optical crystal for generating second harmonics.

In the present laser light emitting device, the time-averaged generated output of the second harmonics in the non-linear optical crystal for generating second harmonics can be controlled by selecting or controlling one or more of the crystal length, crystal temperature, crystal angle, voltage applied across the crystal, center wavelength of the incident light and wavelength distribution of the incident light.

According to the present invention, since the averaged output of the fifth harmonics close to the maximum power can be obtained from a constant time-averaged output of the basic wave, the required power in the light source outputting the basic wave can be decreased, or the fifth harmonics of the maximum power can be produced. Moreover, since there is no risk of generation of ultraviolet light in an amount more than is necessary thus possibly injure an optical system, it becomes possible to elongate the service life of the device.

Also, in the laser light emitting device according to the present invention, in which the second harmonics generating efficiency is optimized during generation of the fifth harmonics, and the efficiency of the fourth and fifth harmonics is increased, the greatest possible amount of the time averaged output of the fifth harmonics can be obtained from the limited time averaged output of the basic wave.

Moreover, with the laser light emitting device according to the present invention, as compared to the conventional laser light emitting device, it is sufficient to generate only a required minimum amount of fourth harmonics. Thus, it becomes possible to decrease the heat evolution in or damage to the optical system including the optical crystals. In addition, with the present laser light emitting device, as compared to the conventional laser light emitting device, the initial cost or exchange cost can be reduced.

DESCRIPTION OF PREFERRED EMBODIMENTS

Referring to the drawings, preferred embodiments of the present invention will be explained in detail.

Figure 1:
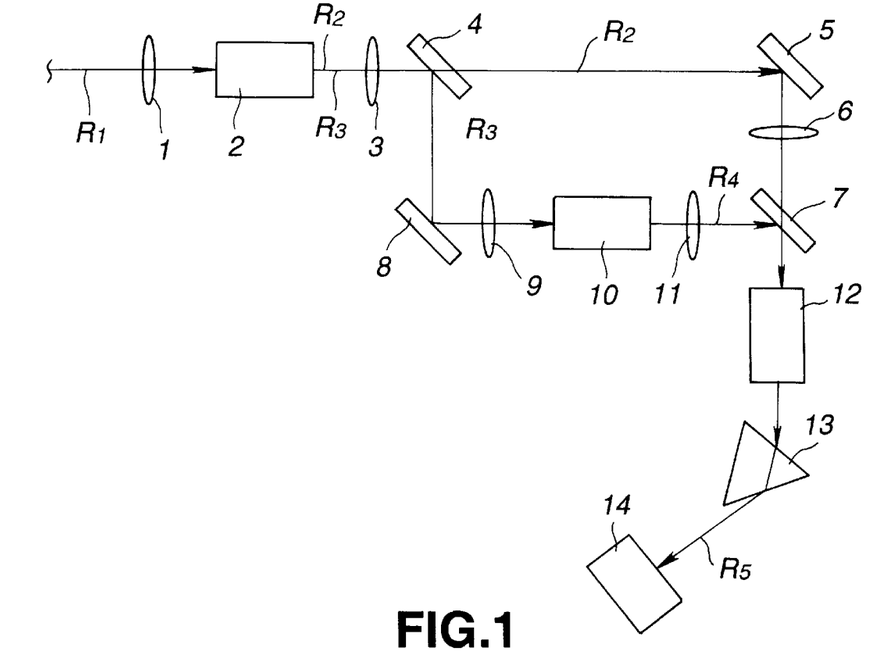
FIG. 1 shows a light path according to a first embodiment of the laser light emission device according to the present invention.

The laser light emission device of the present invention has a light source for generating a continuous wave or pulsed light. From this light source is incident the contiguous wave, which is the continuous wave or the pulsed light, as shown in FIG. 1. This basic wave $R_1$ is throttled into a non-linear optical crystal 2 for second harmonics generation (SHG) by a lens 1. If the peak power of the basic wave $R_1$ is high, the basic wave is throttled such that its peak intensity is not in excess of the damage limit of the non-linear optical crystal 2 for second harmonics generation (SHG). As the case may be, the desired efficiency can be achieved without throttling. This non-linear optical crystal 2 for second harmonics generation emits second high harmonics $R_3$ and the basic wave $R_2$ transmitted through this optical crystal 2 without conversion.

The second high harmonics $R_3$ and the basic wave $R_2$, outgoing from the optical crystal 2, is collimated by a lens 3 into a substantially collimated light beam which then is split by a dichroic mirror 4 into the basic wave $R_2$ and the second harmonics $R_3$. This dichroic mirror 4 deflects the second harmonics $R_3$ by substantially 90°, which angle is, however, merely illustrative. The basic ave $R_2$ is transmitted unchanged through the dichroic mirror 4.

The second harmonics $R_3$ is first reflected by a mirror 8 and throttled by a lens 9 into a non-linear optical crystal for fourth harmonics generation (FHG) 10. The non-linear optical crystal for fourth harmonics generation 10 generates and emits fourth harmonics $R_4$. This fourth harmonics $R_4$ is throttled by a lens 11 to reach a dichroic mirror 7.

On the other hand, the basic wave $R_2$ reaches the dichroic mirror 7 via a reflective mirror 5 and a lens 6. The relative position of the reflective mirror 5 and the lens 6 may also be reversed, that is exchanged. This dichroic mirror 7 combines the fourth harmonics $R_4$ and the basic wave $R_2$ together. The resulting combined wave is incident on a non-linear optical crystal for fifth harmonics generation 12, in which fifth harmonics $R_5$ is generated by additive frequency mixing of the fourth harmonics $R_4$ and the basic wave $R_2$. The generated fifth harmonics $R_5$ is emitted by the non-linear optical crystal for fifth harmonics generation 12 and transmitted through a triangular prism 13 where it is separated from light of the other wavelengths to fall on a light-receiving section of a power meter 14. The fifth harmonics $R_5$ has its power monitored by the power meter 14.

As a light source, a Q-switch Nd:YAG pulse laser excited by a continuous wave semiconductor laser and which is in oscillating operation at a wavelength of 1064 nm, may be used. As the non-linear optical crystal for generation of second harmonics, a lithium borate (LBO) crystal or a barium borate (BBO) crystal, having a high injury threshold value, is preferred.

As for the LBO crystal, such a crystal capable of type-1 phase matching at room temperature is marketed and utilized. This LBO crystal has small walk-off and can achieve a long length for reciprocal action. This LBO crystal has characteristics that position offset in the near field between the outgoing basic wave $R_2$ and the second harmonics $R_3$ is small. In particular, with the non-crystal type-1 phase matching crystal used at approximately 150° C., walk-off can be reduced to zero.

Among the non-linear optical crystals for generation of fourth harmonics, barium borate (BBO) crystals, β-BBO crystals and CLBO crystals are well-known. For a slow repetition frequency, such as not less than 1 kHz, the CLBO crystals are preferred. As the repetition frequency is increased, the BBO crystals with higher thermal conductivity are thought to be preferred. Since the BBO crystal has large walk-off, the length of reciprocal action becomes shorter if the beam diameter in this direction is decreased. Also, since the wavelength of the fourth harmonics is 266 nm, there is a risk of injuring the crystal or the coating in a narrow portion or in the spatial peak portion of the beam, so that attention is required on the part of the operator.

In the present embodiment, if desired to split the light of the generated fifth harmonics with the wavelength of 213 nm by the triangular prism 13, it is desirable that the fifth harmonics be of the P-polarization relative to the prism surface (P-polarization in the lane of the drawing sheet of FIG. 1) for possibly reducing the reflection on the prism surface for realizing effective maximum utilization of the fifth harmonics. If the fifth harmonics are obtained by S-polarization relative to the prism surface, it is necessary to rotate the direction of polarization using a half-wavelength plate (polarizer) with respect to the wavelength of 213 nm. The reason is that there occurs some loss in the UV light inclusive of the fourth harmonics and that the crystal itself and the coating used for the half-wavelength plate tend to be injured on rotation to P-polarization by the half-wavelength plate. As the non-linear optical crystal for generating the fifth harmonics, β-BBO crystals are preferred.

Figure 2:
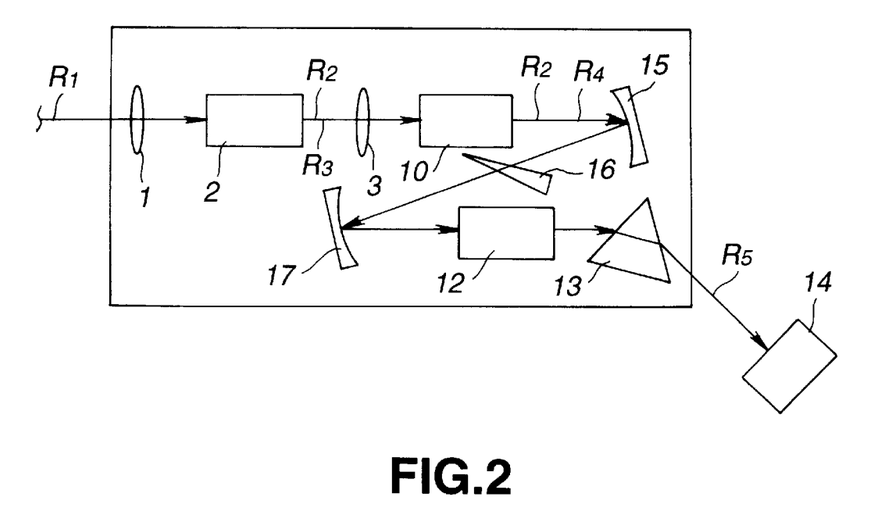
FIG. 2 shows a light path showing a second embodiment of the laser light emission device according to the present invention.

In the laser light emission device of the present invention, some of the lenses may be replaced by concave mirrors (see cover sheet of Laser Focus World, May 1995). Since the concave mirror is insusceptible to color aberration by wavelength dispersion proper to the particular lens material, focal point offset within the non-linear optical crystal for generating fifth harmonics 12 is only small even if the basic wave $R_2$ and the fourth harmonics $R_4$ are arrayed coaxially. In the present embodiment, a wedge prism 16 is arranged in the collimated light for correcting the position offset in the near field between the fourth harmonics generated in the non-linear optical crystal for generating fourth harmonics 10 and the basic wave $R_2$ simultaneously traversing the non-linear optical crystal for generating fourth harmonics 10 for improving overlap therebetween in the non-linear optical crystal for generating fifth harmonics 12 for improving the efficiency. Also, main portions of the wavelength conversion unit are arranged on a substrate for improving stability.

That is, the basic wave $R_1$ is throttled by the lens 1 into the non-linear optical crystal for generating second harmonics 2, which then emits the second harmonics $R_3$ and the basic wave $R_2$ transmitted without conversion through this non-linear optical crystal for generating second harmonics 2.

The second harmonics $R_3$ and the basic wave $R_2$, emitted from the non-linear optical crystal for generating second harmonics 12, are throttled via lens 3 into the non-linear optical crystal for generating fourth harmonics 10, which then generates the fourth harmonics $R_4$ from the second harmonics $R_3$ and emits the generated fourth harmonics $R_4$. The major portion of the basic wave $R_2$ is transmitted unchanged through the non-linear optical crystal for generating fourth harmonics 10. The basic wave $R_2$ and the fourth harmonics $R_4$ are turned by the first concave mirror 15 into the substantially collimated light which is transmitted through the wedge prism 16 to reach the second concave mirror 17. The basic wave $R_3$ and the fourth harmonics $R_4$ are corrected for position offset in the near field by the wedge prism 16. The second concave mirror 17 throttles the basic wave $R_2$ and the fourth harmonics $R_4$ into the non-linear optical crystal for generating fifth harmonics 12. Within this non-linear optical crystal for generating fifth harmonics 12, fifth harmonics $R_5$ is generated by additive frequency mixing of the fourth harmonics $R_4$ and the basic wave $R_2$. The generated fifth harmonics $R_5$ is emitted by this non-linear optical crystal for generating fifth harmonics 12 and thence transmitted through the triangular prism 13 so as to be thereby separated from the light of other wavelengths to fall on the light receiving portion of the power meter 14. The generated fifth harmonics has its power monitored by the power meter 14.

Figure 3:
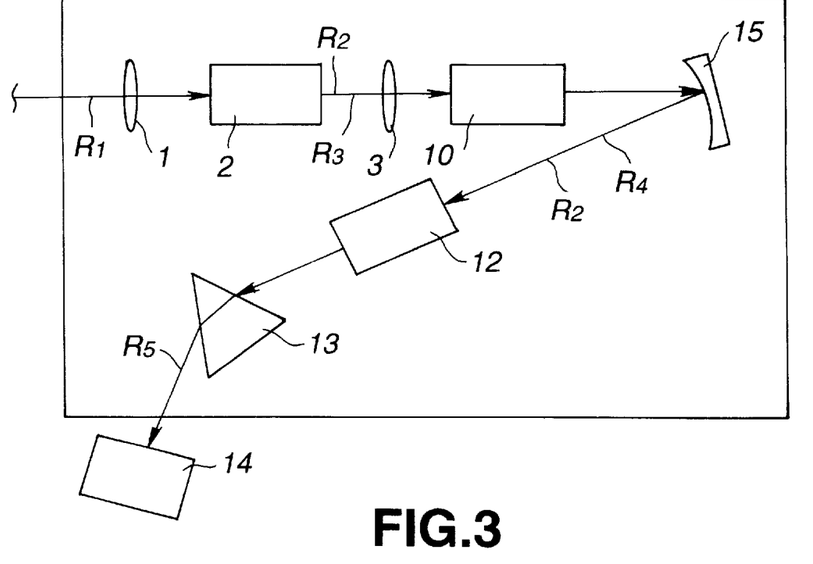
FIG. 3 shows a light path showing a third embodiment of the laser light emission device according to the present invention.

The laser light emitting device according to the present invention may also be configured for projecting with a finite multiplication factor, without performing position correction by the wedge prism, as shown in FIG. 3. That is, the basic wave $R_1$ is throttled by the lens 1 into the non-linear optical crystal for second harmonics 2. From this non-linear optical crystal for second harmonics 2 are emitted the second harmonics $R_3$ and the basic wave $R_2$, which is transmitted in the unconverted state through this non-linear optical crystal for second harmonics 2.

The second harmonics $R_3$ and the basic wave $R_2$, radiated from the non-linear optical crystal for second harmonics 2, are throttled via lens 3 into the non-linear optical crystal for fourth harmonics 10, which then generates fourth harmonics $R_4$ from the second harmonics $R_3$ to emit the generated fourth harmonics $R_4$. The basic wave $R_2$ is directly transmitted through the non-linear optical crystal for fourth harmonics 10. The basic wave $R_2$ and the fourth harmonics $R_4$ are reflected by the first concave mirror 15 so as to be throttled into the non-linear optical crystal for fifth harmonics 12. Within this non-linear optical crystal for fifth harmonics 12, the basic wave $R_2$ and the fourth harmonics $R_4$ are converged as a spot of a constant size so as to be overlapped with each other. Within the non-linear optical crystal for fifth harmonics 12, fifth harmonics $R_5$ is generated by the additive frequency mixing of the fourth harmonics $R_4$ and the basic wave $R_2$. The generated fifth harmonics $R_5$ is emitted from the non-linear optical crystal for fifth harmonics 12 and transmitted through the triangular prism 13 for separation from the light of the other wavelengths to then fall on the light receiving portion of the power meter 14. The fifth harmonics $R_5$ has its power monitored by the power meter 14.

Figure 4:
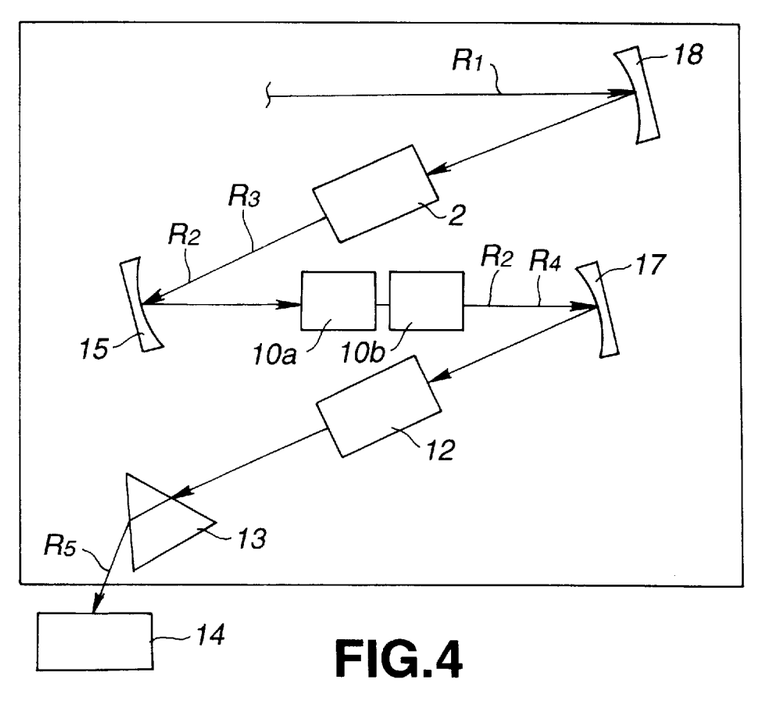
FIG. 4 shows a light path showing a fourth embodiment of the laser light emission device according to the present invention.

The laser light emission device of the present invention may also be configured for converging the laser light only by a concave mirror without employing the lens, as shown in FIG. 4. That is, the basic wave $R_1$ is throttled by a first concave mirror 18 into the non-linear optical crystal for second harmonics 2, which then emits the second harmonics $R_3$ and the basic wave $R_2$ transmitted unaltered through this non-linear optical crystal for second harmonics 2. The second harmonics $R_3$ and the basic wave $R_2$ radiated from the non-linear optical crystal for second harmonics 2 are throttled via a second concave mirror 15 into a pair of non-linear optical crystals for fourth harmonics 10a, 10b. Although a single crystal may be used in place of the paired non-linear optical crystals for generating fourth harmonics 10a, 10b, these two non-linear optical crystals for fourth harmonics 10a, 10b are intentionally used because these exhibit a walk-off cancelling effect.

These non-linear optical crystals for generating fourth harmonics 10a, 10b generate the fourth harmonics $R_4$ from the second harmonics $R_3$ to emit the generated fourth harmonics $R_4$. The major portion of the basic wave $R_2$ are directly transmitted through these non-linear optical crystals for generating fourth harmonics 10a, 10b. These crystals 10a, 10b are arrayed in series on the optical axis and are of opposite walk-off directions. That is, since the direction of offset between the fourth harmonics $R_4$ and the basic wave $R_2$ is opposite to each other in the non-linear optical crystals for generating fourth harmonics 10a, 10b, these position offsets cancel each other such that the fourth harmonics $R_4$ and the basic wave $R_2$ are radiated in a manner free from position offset.

The basic wave $R_2$ and the fourth harmonics $R_4$ are reflected by the third concave mirror 17 so as to be throttled into the non-linear optical crystal for generating fifth harmonics 12. Within the non-linear optical crystal for fifth harmonics 12, fifth harmonics $R_5$ is generated by the additive frequency mixing of the fourth harmonics $R_4$ and the basic wave $R_2$. The generated fifth harmonics $R_5$ is emitted from the non-linear optical crystal for fifth harmonics 12 and transmitted through the triangular prism 13 for separation form the light of the other wavelengths to then fall on the light receiving portion of the power meter 14. The fifth harmonics $R_5$ has its power monitored by the power meter 14.

In the present laser light emission device, the type of the laser used as a light source or the waveform conversion arrangement as described above are merely illustrative and various modifications may be envisaged within the scope of the present invention.

Next, calculations for optimizing the efficiency of generating the second harmonics are carried out.

The equation for calculations, shown first, is low in conversion efficiency in the process for each waveform conversion process, and is such a calculation method in which the input wave diminishing effect during waveform conversion is disregarded. As may be apparent from the results of calculations, the conversion efficiency is increased at an optimum point. Although there is raised a problem in authenticity in approximation, this equation of calculations is, easy to comprehend and hence is explained by way of introduction.

Figure 5:
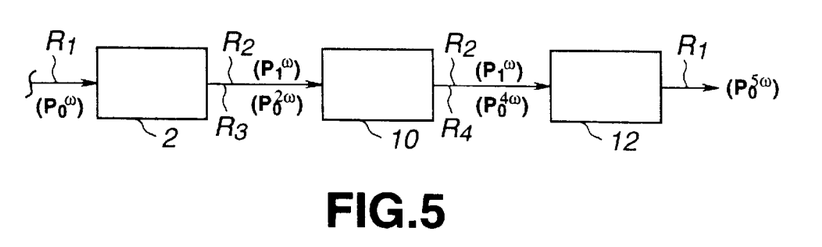
FIG. 5 is a block diagram for illustrating wavelength conversion in the laser light emission device.

Referring to FIG. 5, if the average power of the input basic wave is $P_0\omega$ (with the unit of the power being watt W), $\eta_2$ is the conversion efficiency per unit input power and $P_0 2\omega$ is the mean power of the generated second harmonics, and if the input wave attenuating effect during waveform conversion is disregarded, the following relation:

$$P_0^{2\omega} = \eta_2 (P_0^{\omega})^2 \qquad (1)$$

holds.

For simplicity, it is assumed in the following that the absorption or scattering occurring on the inner crystal surface or losses in optical components, such as lenses, are sufficiently small. The fourth harmonics can be similarly represented by:

$$P_0^{4\omega} = \eta_4 (P_0^{2\omega})^2 \qquad (2)$$

where $\eta_4$ is the conversion efficiency per unit input power and $P_0 4\omega$ is the generated fourth harmonics power. The power of the fifth harmonics is obtained by the sum frequency of the basic wave not converted into the second harmonics and the fourth harmonics. Since the power of the basic wave not converted into the second harmonics is given by:

$$P_1^{\omega} = P_0^{\omega} - P_0^{2\omega} \qquad (3)$$

the generated fifth harmonics power is given by:

$$P_0^{5\omega} = \eta_5 P_1^{\omega} P_0^{4\omega} \qquad (4)$$

where $\eta_5$ is the conversion efficiency per unit input power. Substituting the equation (1) to equation (3), the equation (4) can be rewritten to:

$$P_0^{5\omega} = \eta_2^2 \eta_4 \eta_5 (P_0^{\omega} - \eta_2 (P_0^{\omega})^2)(P_0^{\omega})^4 \qquad (5)$$

It is seen from this that the output of the fifth harmonics is simply proportionate to $\eta_4$, $\eta_5$. Thus it suffices to make designing so that $\eta_4$, $\eta_5$ shall be as large as possible. However, if the fifth harmonics output is maximized, there is a limit to the input power that can be exploited. If $P_0\omega$ is fixed as the maximum power that can be utilized, there is a possibility of optimizing the fifth harmonics with respect to $\eta_2$, as seen from the equation (6):

$$P_0^{5\omega} = \eta_4 \eta_5 \{(P_0^{\omega})^5 \eta_2^2 - (P_0^{\omega})^6 \eta_2^3\} \qquad (6)$$

which is further modified from the equation (5). If, with a constant input, $P_0 5\omega$ is differentiated with respect to $\eta_2$, we obtain the equation (7):

$$\eta_2 = \frac{2}{3P_0^{\omega}} \qquad (7)$$

At this time, the fifth harmonics assumes a maximum value as shown by the equation (8):

$$P_0^{5\omega} = \frac{4\eta_4 \eta_5}{27}(P_0^{\omega})^5 \qquad (8)$$

Thus, if desired to obtain the largest possible fifth harmonics from the power of a given basic wave, the direction for increasing the generation efficiency of the quadrupled and pentatupled waves is obvious. However, as for the generation efficiency of the second harmonics, it is unnecessary to maximize the efficiency such that it is sufficient if the following equation (9):

$$\frac{P_0^{2\omega}}{P_0^{\omega}} = \eta_2 P_0^{\omega} = \frac{2}{3} \qquad (9)$$

is me, that is the direction is not obvious. That is, if this simple model is considered, it suffices if the crystal length, crystal temperature, crystal angle or other conditions are set for developing the power of second harmonics which is 67% of the basic input power. If this conversion efficiency is 50 to 80%, the power of the fifth harmonics becomes not lower than 85%. The conversion efficiency is preferably not higher than 67% considering that the conversion efficiency 67% or higher is meaningless for approaching the maximum power, the conversion efficiency close to 70% can be obtained only with difficulties with the Gaussian pulse waveform and that, since an excess UV power is obtained in the next stage, the problem of heat generation or damage due to absorption becomes acute especially in a continuous wave.

Figure 6:
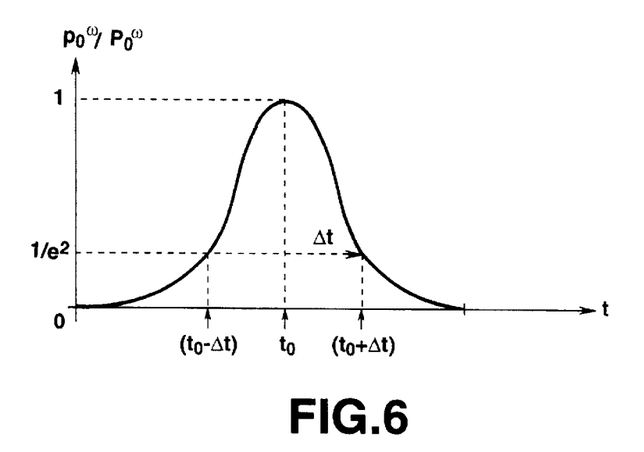
FIG. 6 is a timing chart showing a Gaussian pulse wave in the laser light emission device.
Figure 7:
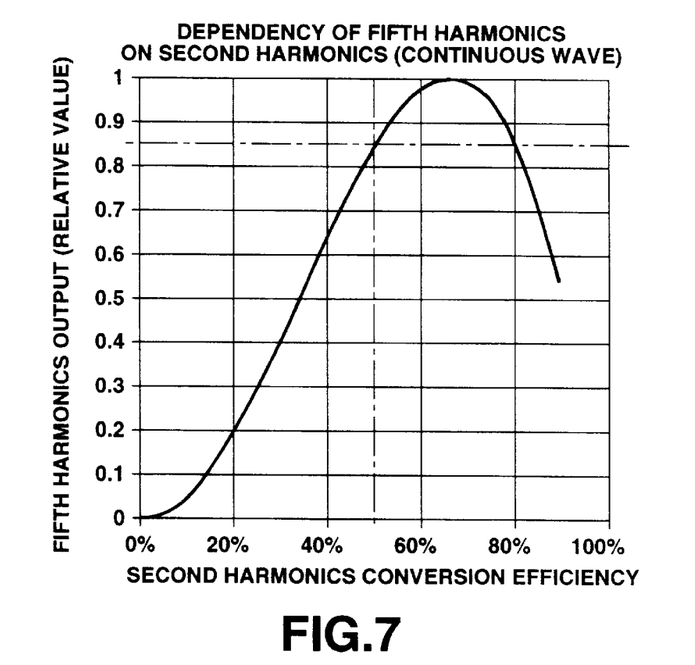
FIG. 7 is a graph showing second harmonics generating efficiency dependency of the fifth harmonics in the laser light emission device.

Next, a pulse light having Gaussian time-dependency is considered. If, as shown in FIG. 6, the total width of a pulse ($1/e^2$) of the basic wave is $2\Delta t$ (sec), the peak power is $P_0\omega$ and the time until reaching the peak is $t_0$, time changes $P_0\omega$ of the pulse power to a sole pulse is given by $$P_0^{\omega}(t) = P_0^{\omega} \exp\left[-\frac{2(t-t_0)^2}{\Delta t^2}\right] \qquad (10)$$

while the energy contained in this pulse is given by:

$$E_0^{\omega} = \int_{-\infty}^{\infty} P_0^{\omega}(t) dt \qquad (11)$$

Calculating by the equation (10), we obtain:

$$E_0^{\omega} = \Delta t \sqrt{\frac{\pi}{2}} P_0^{\omega} \qquad (12)$$

As in the case of the continuous wave, the power of the second harmonics is given by:

$$P_0^{2\omega}(t) = \eta_2 \{P_0^{\omega}(t)\}^2 \qquad (13)$$

while the fourth harmonics is given by:

$$P_0^{4\omega}(t) = \eta_4 \{P_0^{2\omega}(t)\}^2 \qquad (14)$$

The fifth harmonics are given by:

$$P_0^{5\omega}(t) = \eta_5 P_1^{\omega}(t) P_0^{4\omega}(t) \qquad (15)$$

where $$P_1^{\omega}(t) = P_0^{\omega}(t) P_0^{2\omega}(t) \qquad (16)$$

is the basic wave not converted into second harmonics. Calculating the equation (15) using the equation (16), we obtain:

$$P_1^{5W}(t) = h_2^2 h_4 h_5 [\{P_0^W(t)\}^5 - h_2\{P_0^W(t)\}^6] \quad (17)$$

The pulse energy of the fifth harmonics is obtained by integrating the equation (17):

$$E_0^{5\omega} = \int_{-\infty}^{\infty} P_0^{5\omega}(t)\,dt \quad (18)$$

$$= \eta_2^2 \eta_4 \eta_5 \int_{-\infty}^{\infty} [\{P_0^{\omega}(t)\}^5 - \eta_2\{P_0^{\omega}(t)\}^6]\,dt$$

$$= \eta_2^2 \eta_4 \eta_5 \int_{-\infty}^{\infty} \left\{ (P_0^{\omega})^5 \exp\left[-\frac{10(t-t_0)^2}{\Delta t^2}\right] - \eta_2 (P_0^{\omega})^6 \exp\left[-\frac{12(t-t_0)^2}{\Delta t^2}\right] \right\} dt$$

$$= \eta_4 \eta_5 \Delta t \sqrt{\pi}\, (P_0^{\omega})^5 \left\{ \frac{1}{\sqrt{10}} \eta_2^2 - P_0^{\omega} \frac{1}{\sqrt{12}} \eta_2^3 \right\}$$

In addition to the obvious efficiency improving effect of enlarging $\eta_4$ and $\eta_5$, the conversion efficiency to the fifth harmonics becomes maximum for:

$$\eta_2 = \sqrt{\frac{8}{15}} \frac{1}{P_0^{\omega}} \quad (19)$$

by optimization with respect to $\eta_2$ for constant $P_0\omega$, such that the maximum efficiency:

$$\frac{E_0^{5\omega}}{E_0^{\omega}} = \eta_4 \eta_5 \frac{8\sqrt{5}}{225} (P_0^{\omega})^2 \quad (20)$$

is obtained. The conversion efficiency at a mean power from the basic wave to the second harmonics is given by:

$$\frac{E_0^{2\omega}}{E_0^{\omega}} = \frac{\int_{-\infty}^{\infty} P_0^{2\omega}(t)\,dt}{\int_{-\infty}^{\infty} P_0^{\omega}(t)\,dt} \quad (21)$$

$$= \frac{\eta_2 \Delta t \sqrt{\frac{\pi}{4}} (P_0^{\omega})^2}{\Delta t \sqrt{\frac{\pi}{2}} P_0^{\omega}}$$

$$= \frac{2}{\sqrt{15}}$$

Figure 8:
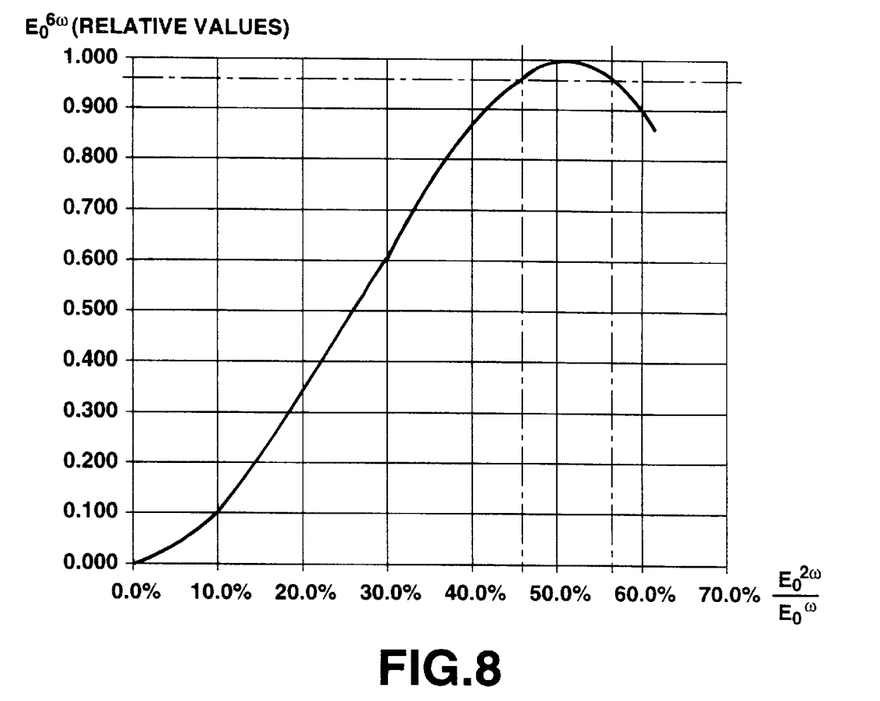
FIG. 8 is a graph showing the effect of efficiency optimization in case the basic wave reducing effect in the pulse input in the laser light emission device is disregarded.

If, for constant $P_0\omega$, the equation (18) is plotted as a function of the pulse energy conversion efficiency, $E_0 2\omega/E_0\omega$, the result is shown in FIG. 18. In the case of a pulse, since the energy per pulse multiplied by the pulse repetition frequency gives a mean power, the conversion efficiency of the pulse energy is equal to the mean power conversion energy. Therefore, in the following description, the pulse energy conversion energy is handled as being equivalent to the mean output conversion efficiency. By setting the conversion efficiency for the mean output from the basic wave to the second harmonics so as to be close to 52%, the efficiency can be increased to a maximum value, as shown in FIG. 8.

Conversely, if the conversion efficiency to the second harmonics is raised to more than an optimum conversion efficiency, the fifth harmonics generated is decreased. If $E_0 2\omega/E_0\omega$ is from 47% to 57%, the output of the generated fifth harmonics meritoriously amounts to not less than 96% of the maximum value. On the other hand, it suffices to set the ratio $E_0 2\omega/E_0\omega$ to 42% to 60% for realizing the generated output of the fifth harmonics of not less than 90%.

Figure 9:
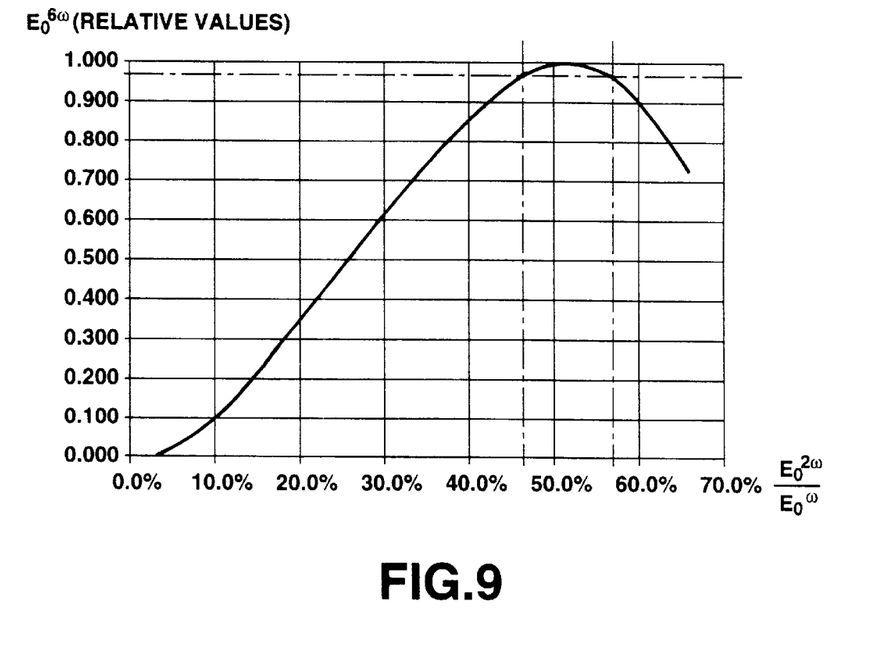
FIG. 9 is a graph showing the effect of efficiency optimization in case the basic wave reducing effect in the pulse input is calculated using an approximation equation.

In the foregoing, the conversion efficiency is optimized in case the effect of the diminishing input wave during waveform conversion is disregarded. In actuality, the optimum value tends to be varied slightly due to the effect of the diminishing input wave. In this case, the approximate actual conversion efficiency can be estimated by dividing the conversion efficiency $\eta_2 P_0\omega$ at a pulse peak as found based on the assumed nil basic wave diminishing effect by $(1+\eta_2 P_0\omega)$, as shown in FIG. 9. Comparison of FIGS. 8 and 9 reveals that the peak position difference is only small such that the above equation used for estimation suffices. In this case, the generated output of the fifth harmonics becomes equal to not less than 96% of the maximum value when $E_0 2\omega/E_0\omega$ is 47% to 57%, substantially similarly to the value given above.

What is claimed is:

1. A laser light emitting device comprising:
    a light source which generates a continuous-wave laser light beam as a fundamental wave;
    a non-linear optical crystal which generates a second harmonic, on which said fundamental wave is incident with a first power;
    a second non-linear optical crystal which generates a fourth harmonic, on which the second harmonic generated by said non-linear optical crystal is incident; and
    a third non-linear optical crystal which generates a fifth harmonic, on which the fundamental wave transmitted through said non-linear optical crystal and the fourth harmonic generated by said second non-linear optical crystal are incident, wherein said third non-linear optical crystal mixes these incident waves to generate said fifth harmonic;
    wherein the non-linear optical crystal has characteristics such that the second harmonic output from said non-linear optical crystal has a second powers and the second power is 50% to 70% of the first power.

2. The laser light emitting device as claimed in claim 1 wherein said light source is one of a Nd:YAG laser, a Nd:YLF laser, and a solid-state laser doped with neodymium ions including Nd:YVO$_4$.

3. The laser light emitting device as claimed in claim 1 wherein the non-linear optical crystal is a lithium triborate crystal, the second non-linear optical crystal is a β-barium borate crystal, and the third non-linear optical crystal is a β-barium borate crystal.

4. The laser light emitting device as claimed in claim 1, wherein the fifth harmonic propagating from the third non-linear crystal has a direction of polarization, and wherein the laser light emitting device also includes:
    a dispersion prism which separates the fifth harmonic from light of other wavelengths, wherein the dispersion prism has a surface on which the direction of polarization of the fifth harmonic propagating from the third non-linear optical crystal is a P-polarization direction.

5. The laser light emitting device as claimed in claim 1, also including:
    a wedge prism positioned to receive radiation propagating from the second non-linear optical crystal, said radiation comprising the fourth harmonic and a transmitted portion of the fundamental wave, wherein transmission of the radiation through said wedge prism corrects near field center position deviation between the fourth harmonic and the transmitted portion of the fundamental wave.

6. A laser light emitting device comprising:
- a light source which emits a pulsed light beam as a fundamental wave;
- a non-linear optical crystal which generates a second harmonic, on which said fundamental wave is incident with a first time-averaged power;
- a second non-linear optical crystal which generates a fourth harmonic, on which the second harmonic generated by said non-linear optical crystal is incident; and
- a third non-linear optical crystal which generates a fifth harmonic, on which the fundamental wave transmitted through said non-linear optical crystal and the fourth harmonic generated by said second non-linear optical crystal are incident, wherein said third non-linear optical crystal mixes these incident waves to generate the fifth harmonic;
- wherein the non-linear optical crystal has characteristics such that the second harmonic output from said non-linear optical crystal has a second time-averaged power and the second time-averaged power is 47% to 57% of the first time-average power.

7. The laser light emitting device as claimed in claim 6 wherein said light source is one of a Nd:YAG laser, a Nd:YLF lasers and a solid-state laser doped with neodymium ions including Nd:YVO$_4$.

8. The laser light emitting device as claimed in claim 6 wherein said laser light source is a Q-switched laser.

9. The laser light emitting device as claimed in claim 6 wherein said light source is a pulse laser of semiconductor laser excitation with a repetition frequency of not less than 1 kHz.

10. The laser light emitting device as claimed in claim 6 wherein the non-linear optical crystal is a lithium triborate crystal, the second non-linear optical crystal is a β-barium borate crystal and the third non-linear optical crystal is a β-barium borate crystal.

11. The laser light emitting device as claimed in claim 6, wherein the fifth harmonic propagating from the third non-linear crystal has a direction of polarization, and wherein the laser light emitting device also includes:
- a dispersion prism which separates the fifth harmonic from light of other wavelengths, wherein the dispersion prism has a surface on which the direction of polarization of the fifth harmonic propagating from the third non-linear optical crystal is a P-polarization direction.

12. The laser light emitting device as claimed in claim 6, also including:
- a wedge prism positioned to receive radiation propagating from the second non-linear optical crystal, said radiation comprising the fourth harmonic and a transmitted portion of the fundamental wave, wherein transmission of the radiation through said-wedge prism corrects near field center position deviation between the fourth harmonic and the transmitted portion of the fundamental wave.

* * * * *

UNITED STATES PATENT AND TRADEMARK OFFICE
CERTIFICATE OF CORRECTION

PATENT NO. : 6,055,249
DATED : April 25, 2000
INVENTOR(S) : HISASHI MASUDA

It is certified that error appears in the above-identified patent and that said Letters Patent is hereby corrected as shown below:

In Line 2 of the abstract delete the word "basic" and insert fundamental;

In Line 3 of the abstract between the words "generating" and "second" insert the word a;

In Line 3 of the abstract delete the word "harmonics" and insert the word harmonic;

In Line 4 of the abstract delete the word "basic" and insert the word fundamental;

In Line 5 of the abstract between the words "generating" and "fourth" insert the word a;

In Line 5 of the abstract delete the word "harmonics" and insert the word harmonic;

In Line 6 of the abstract delete the word "harmonics" and insert the word harmonic;

In Line 7 of the abstract between the words "generating" and "second" insert the word the;

In Line 7 of the abstract delete the word "harmonics" and insert the word harmonic;

In Line 8 of the abstract between the words "generating" and "fifth" insert the word a;

In Line 8 of the abstract delete the word "harmonics" and insert the word harmonic;

In Line 9 of the abstract delete the word "basic" and insert the word fundamental;

In Line 10 of the abstract between the words "generating" and "second" insert the word the;

In Line 10 of the abstract delete the first occurence of the word "harmonics" and insert the word harmonic;

UNITED STATES PATENT AND TRADEMARK OFFICE
CERTIFICATE OF CORRECTION

PATENT NO. : 6,055,249
DATED : April 25, 2000
INVENTOR(S) : HISASHI MASUDA

It is certified that error appears in the above-identified patent and that said Letters Patent is hereby corrected as shown below:

In Line 10 of the abstract between the words "and" and "fourth" insert the word the;

In Line 10 of the abstract delete the second occurence of the word "harmonics" and insert the word harmonic;

In Line 11 of the abstract between the words "generating" and "fourth" insert the word the;

In Line 12 of the abstract delete the word "harmonics" and insert the word harmonic;

In Line 13 of the abstract between the words "generating" and "fifth" insert the word the;

In Line 13 of the abstract delete the word "harmonics" and insert the word harmonic;

In Line 13 of the abstract delete the word "additively";

In Line 14 of the abstract between the words "generating" and "fifth" insert the word the;

In Line 14 of the abstract delete the word "harmonics" and insert the word harmonic;

Signed and Sealed this

Tenth Day of April, 2001

Attest:

NICHOLAS P. GODICI

*Attesting Officer*   Acting Director of the United States Patent and Trademark Office